United States Patent Office  
3,331,134  
Patented July 18, 1967

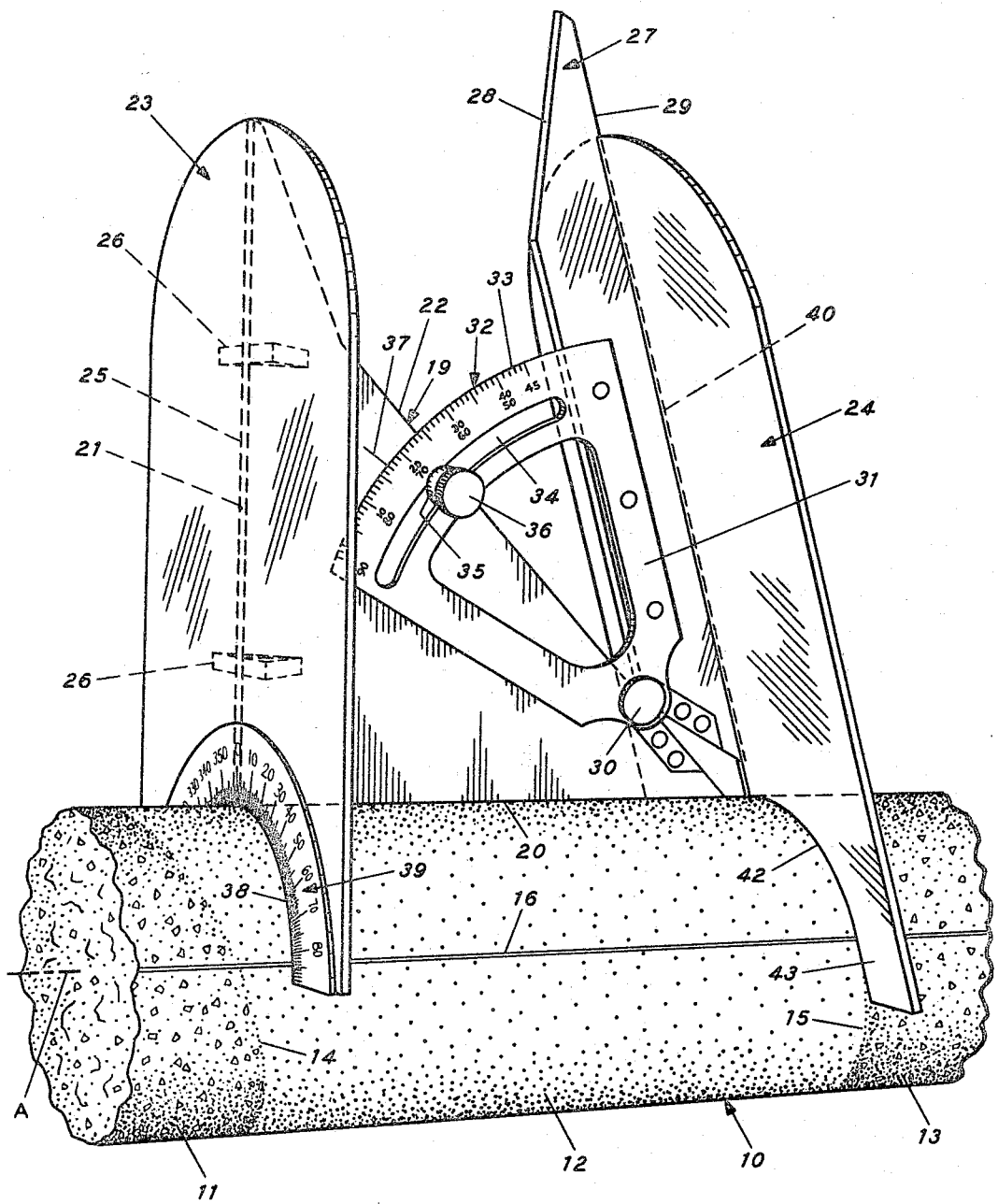

3,331,134
EARTH FORMATION CORE PROTRACTOR
Robert L. Jackson and Robert M. Campbell, both of Jackson, Miss., assignors to Chevron Research Company, San Francisco, Calif., a corporation of Delaware
Filed Sept. 20, 1965, Ser. No. 488,559
4 Claims. (Cl. 33—75)

ABSTRACT OF THE DISCLOSURE

An earth formation protractor for improving the accuracy of measuring the dip of inclined strata of a formation core with respect to a plane normal to its axis of symmetry by means of a protractor plate attached to triangle means having an adjustable pivot side which includes a sight bar attached thereto for alignment with one of the interfaces of the strata of the core.

This invention relates to earth formation core protractors and has for a primary object improving the accuracy of measuring the dip of inclined strata forming such cores with respect to a plane normal to their respective axes of symmetry.

In accordance with the present invention, this object is accomplished through the use of an apparatus comprising a protractor plate and a drafting triangle suitably connected to be aligned with the strata in a core sample.

In more particular detail, the drafting triangle includes a sight bar slidably attached to the adjustable pivot side of the triangle for alignment with one of the interfaces of such strata and a registry scale graduated in degrees of a circle to measure the complement of the angle formed between the adjustable side and a first fixed side of the triangle in tangential contact with the core.

To establish two planes perpendicular to and coincident with the axis of symmetry (at the plane of measurement), the protractor plate is permanently attached to the drafting triangle along a second fixed side. The plate may also have an arcuate periphery in partial circumferential contact with the core. The dip of the strata, as indicated by the registry scale of the triangle, must however be normalized to conventional compass directions to allow geologists to accurately interpret the core and to reconstruct the earth formation from which the core is taken. For this purpose, the protractor plate is also provided with a second registry scale at the arcuate edge to measure the angle between the line of contact of the triangle with the core and a fixed reference groove scribed in the core parallel to the axis of symmetry at the time the core is cut from the earth. In that manner, both the dip of the interface of each of the inclined strata with respect to a plane normal to the axis of symmetry of the core, as well as the angular displacement between the interface where the dip is measured, and a fixed reference groove in the core can be both accurately and simultaneously determined.

Other objects and features of the invention will appear throughout the following specification illustrating a single embodiment of the invention.

Referring now to a single figure illustrating the earth core protractor embodying the present invention in perspective view, it will be seen that the numeral 10 depicts an earth core cut from a portion of the earth by a conventional coring tool. The core 10 includes inclined strata 11, 12 and 13 intersecting along interfaces 14 and 15 through its central body and, at the side surface, has a reference groove 16 circumferentially spaced to provide a standard mark by which the dip and strike of the interfaces may be related to compass directions. As indicated, the surface of the core 10 is substantially parallel to the axis of symmetry A. To establish a reference plane normal to the axis of symmetry A, an adjustable triangular template 19 is adapted to be located in contact with this surface along a first fixed side 20 and has, in addition, a second fixed side 21 intersecting side 20 at 90° to establish the required reference plane. As shown, the template 19 is a conventional, adjustable drafting triangle and is provided with front and back broad surfaces which terminate at the sides 20 and 21 along two of the sides and along stepped side 22 at the third side, any two of which defining a permanent angle therebetween. Inasmuch as the template is relatively thin, it is adapted to be permanently supported by a protractor plate 23 in edge contact with the core in a plane passing through the axis A. For this purpose, side 21 is permanently attached to the broad surface of the plate 23 by means of an adhesive placed along groove 25 and at the intersection of the faces of gussets 26; the broad surfaces of the plate and template are thus located in planes normal to one another. Stepped side 22 is not straight as are sides 20 and 21 but is composed of two inclined surfaces intersecting side 21 to provide better positive alignment between it and an extension element 27 pivotally attached to the template near the intersection of the sides 21 and 22. As shown, the extension 27 has rectangularly broad surfaces terminating along a first side 28 adapted to fit in edge contact with side 22 and a second side 29 to which is attached a sight bar 24. Between these sides, the extension is provided with a hinge 30 attached to a hinge support 31. As illustrated, the more remote edge of the hinge support 31 is provided with a scale 32 composed of graduations 33 of a circle. Below these marks a slot 34 is also provided within which rides set screw 35 having a co-operative thumb nut 36 for releasably attaching the hinge support to the template 19. The graduations 33 indicate the angle formed between the side 29 of the extension 27 and the lower side 20 of the template, as well as the complement of this angle. It is noted that central registry mark 37 on the template normalizes the graduations 33 to the angle formed between sides 20 and 21 in the closed position.

As previously indicated, the protractor plate 23 is secured along its broad surface to the adjustable template 19 for permanent alignment of the template in a plane perpendicular to the core and passing through the axis of symmetry of the core. For this purpose, an arcuate surface 38 is provided at the lower side of the plate 23 to establish partial circumferential contact between the plate and the core. The plate 23 also is provided with a scale 39 adjacent to surface 38 graduated in two directions at its intersection with the template 19 to read angles formed between the side 20 of the template and the reference groove 16 on the surface of the core. Preferably, the arcuate surface has a center of formation coincident with axis A and defines a radius equal to that of the core 10 so that the graduations forming the scale 39 terminate adjacent to the surface of the core.

Sighting bar 24 slidably attaches to side 29 of extension 27, as by groove 40, so that the broad surfaces of the parts are also substantially normal to one another. The bar 24 provides at its remote end a semicircular guide cavity partially circumferentially gripping the core along the curved edge 42. Preferably, the cavity has a diameter equal to that of the core but its center need not be located coincident with the axis A as bar 24 does not support the template but only serves as an alignment guide. Pairs of fingers 43 are also provided to more easily align these interfaces as the extension 27 is pivoted relative to the template 19.

From the foregoing description, it will be seen that the adjustable triangle template 19 and the protractor plate 23 are first placed on the core 10 with the side 20 of the template in longitudinal edge contact with the core. As plate 23 is permanently attached to template 19, the arcuate surface 38 of the protractor plate is also in partial circumferential contact with the core. It will be noted that the side 20 is preferably aligned along the core with the high point of the interface whose dip and strike is to be measured where the high point is determined by transposing the core to its original position within the earth and, with the core so positioned, measuring the point along the interface nearest the earth's surface. In such a position, the protractor plate and template are placed between the near end of the core measured from the earth's surface and the high points, in sequence, of the interfaces to be measured, proceeding from the near strata interfaces to the most remote. The sighting bar is then placed in slidable contact with the side 29 of the extension 27 of the template; and the extension is pivotally adjusted relative to the template by means of hinge 30 until the lower portion of the sighting bar 24, including fingers 43, is aligned along the interface of the core. The complementary angle between the side 29 of extension 27 and the side 20 of the template—i.e., the dip of the interface—is then determined by means of the graduations 33 on scale 32 of the hinge support 31 and the registry mark 37 on the template. Next, the dips of the interfaces are transformed to true compass directions by measuring the angle between side 20 of the template as aligned with the high point of the interfaces 14 and 15 and the reference groove 16. The data may then be normalized by data developed by photographs taken simultaneously with the cutting of the core. In that manner, geologists can reconstruct the spatial orientation of the earth's strata with increased accuracy to enhance their ability to analyze its structural complications.

These and other advantages are obtainable when operating in accordance with one foregoing embodiment of the invention or with any of numerous variations that could be made by those skilled in the art without departing from the spirit of the invention; and all such variations that fall within the scope of the appended claims are intended to be embraced thereby.

We claim:

1. In accurately measuring the dips of an earth formation core having inclined bedding interfaces, a longitudinal reference groove, and an axis of symmetry, relative to a plane normal to said axis of symmetry, a protractor of the class described comprising: a support means extending normal to said axis of symmetry and in contact with said earth core, a triangle means attached to said support means having a pivotally adjustable side, and second and third sides normal to one another, said second side in contact with said support means and said third side in contact with said core, and means to indicate angular displacement between said adjustable side, and said third side in contact with said core to determine the complement of such a displacement, and an alignment means attached to said adjustable side of said triangle means, in registry with said core, and pivotally movable therewith for alignment with one of said bedding interfaces of said core.

2. Protractor of claim 1 in which said support means includes an arcuate edge to receive said core, and indicating means to measure angular displacement between said third fixed side in contact with said core and said longitudinal reference groove.

3. Protractor of claim 1 in which said alignment means includes an arcuate edge in contact with said core defining fingers for alignment along one of said bedding interfaces.

4. In the accurate measurement of dips of an earth formation core having inclined bedding interfaces, an axis of symmetry, and a reference groove parallel to said axis, said measurements being relative to a plane normal to said axis, a protractor of class described comprising: a protractor plate extending normal to and having an arcuate edge in partial circumferentially gripping contact with said earth core, a triangle template having broad surfaces terminating in a pivotally adjustable side and two fixed sides normal to one another in edge supporting contact with said protractor plate and said core, respectively, registry means to indicate angular displacement between said adjustable side and said plane normal to said axis of symmetry, and a sighting bar having an arcuate edge in partial circumferential edge contact with said core and a broad surface slidably attached to said adjustable side of said template and pivotally movable therewith for alignment with one of said bedding interfaces of said core.

References Cited

UNITED STATES PATENTS

| 1,778,981 | 10/1930 | McLaughlin | 33—174 |
| 2,170,146 | 8/1939 | Kothny | 33—75 XR |

FOREIGN PATENTS

| 1,124,625 | 7/1956 | France. |
| 1,287,414 | 2/1962 | France. |

LEONARD FORMAN, *Primary Examiner.*

HARRY N. HAROIAN, *Examiner.*